United States Patent [19]
Smith, Jr. et al.

[11] Patent Number: 5,265,409
[45] Date of Patent: Nov. 30, 1993

[54] UNIFORM COOLING FILM REPLENISHMENT THERMAL LINER ASSEMBLY

[75] Inventors: Paul A. Smith, Jr., Palm Beach Gardens; George J. Kramer, Jupiter, both of Fla.

[73] Assignee: United Technologies Corporation, Hartford, Conn.

[21] Appl. No.: 995,406

[22] Filed: Dec. 18, 1992

[51] Int. Cl.⁵ .............................. F02C 7/00
[52] U.S. Cl. .................... 60/39.02; 60/39.3; 60/752
[58] Field of Search ............ 60/39.31, 39.32, 752, 60/754, 756, 755, 39.02; 431/154; 29/890.02; 403/24, 300, 303

[56] References Cited

U.S. PATENT DOCUMENTS

| | | | |
|---|---|---|---|
| 3,199,294 | 8/1965 | Hagen | 60/39.32 |
| 3,500,639 | 3/1970 | Stamm | 60/39.31 |
| 3,854,285 | 12/1974 | Stenger et al. | 60/756 |
| 4,422,300 | 12/1983 | Dierberger et al. | 60/754 |
| 4,512,159 | 4/1985 | Memmen | 60/752 |
| 4,848,089 | 7/1989 | Crnaer | 60/752 |
| 5,055,032 | 10/1991 | Altemark et al. | 431/154 |
| 5,083,424 | 1/1992 | Becker | 60/39.31 |
| 5,103,638 | 4/1992 | Roberts et al. | 60/39.31 |
| 5,129,447 | 7/1992 | Hammer | 60/752 |

FOREIGN PATENT DOCUMENTS 71391 12/1959 France ...................... 60/752

Primary Examiner—Richard A. Bertsch
Assistant Examiner—Timothy S. Thorpe
Attorney, Agent, or Firm—Christopher T. Hayes

[57] ABSTRACT

A gas turbine engine liner assembly is disclosed having uniformly spaced rows of cooling orifices oriented perpendicular to the combustion gas flow of the engine. The orifices within each row are spaced equidistant from adjacent orifices within the same row, thereby providing a uniform, uninterrupted pattern of cooling orifices over the hot side of the liner. The liner is secured to a component of the gas turbine engine by a plurality of fasteners which are secured to the liner without affecting the uniform pattern of the cooling orifices.

11 Claims, 3 Drawing Sheets

UNIFORM COOLING FILM REPLENISHMENT THERMAL LINER ASSEMBLY

The invention was made under a U.S. Government contract and the Government has rights herein.

DESCRIPTION

1. Field of the Invention

This invention is related to fluid cooled thermal liners of the type used to protect components of gas turbine engines.

2. Background of the Invention

Designers of gas turbine engines know that, as a general rule, the strength of a structural component material decreases dramatically as the component approaches the melting point of the material from which it is composed. The yield, or "creep", of a given structural component is a function of the temperature of the component, the load acting on the component, and the length of time the component has been exposed to the aforementioned temperature and load. It is also well accepted that, in order to increase the fuel efficiency of gas turbine engines, the engines must be designed to operate at the highest possible temperatures, temperatures at which most structural materials would quickly creep excessively, melt, or support combustion. Accordingly, in order to achieve the goal of higher operating temperatures for gas turbine engines, the structural components must be protected from the hot combustion gas as it passes through the engine.

One means of protecting the structural components is to place a thermal liner between the combustion gas of the engine and the structural component. Such liners are typically cooled by a fluid such as air, which is bled from the relatively cooler compressor section of the gas turbine engine. This air is typically hundreds of degrees cooler than the combustion gas, and when impinged on the liner absorbs large quantities of heat. Additionally, these liners typically include orifices through which the cooling air transpires into the hot combustion gas stream to provide film cooling of the "hot side" of the liner. The hot side of the liner may also be coated with a thermal barrier material to impede heat transfer from the combustion gas to the liner, thereby reducing the operating temperature of the liner and/or reducing the amount of cooling air required.

Although coated liners which incorporate impingement and transpiration film cooling have proven very effective at protecting the structural components of gas turbine engines, the liners themselves are subject to failure due to "hot spots" on the liner. These hot spots, which appear as discolorations or "hot streaks" on the thermal barrier coating, are the result of inadequate cooling, and in particular, usually result from inadequate film cooling over a portion of the thermal barrier coating. Without the benefit of adequate film cooling, the thermal barrier material at the hot streaks is exposed to excessively high temperatures, which may cause the thermal barrier coating to crack and flake away. Stripped of the thermal barrier coating, that portion of the liner is directly exposed to the detrimental effects of the excessive temperature of the combustion gas. Although impingement cooling may continue cooling the stripped portion of the liner, impingement cooling air flow alone is inadequate to provide sufficient heat transfer to protect the liner from failure or "burn through" by the combustion gas.

One cause of hot streaks on the liner is non-uniform replenishment of the cooling film. Since the cooling film provided by liner orifices migrates into the combustion gas stream and heats up as the film moves along the liner, the film must be replenished at a rate at least as great as the rate at which the cooling film migrates and/or heats up. For example, if some of the liner orifices become clogged, the cooling film provided by the liner orifices upstream of clogged liner orifices may become too thin and/or too hot to provide adequate film cooling at the portion of the liner having the clogged orifices and immediately downstream thereof.

Even where the liner orifices do not become clogged, the design of the liner itself may produce non-uniform film replenishment. For example, FIGS. 1 and 2 show a typical cooling liner assembly 10 of the prior art which includes an outer liner sheet 11 having one face 12 coated with a thermal barrier material 13, an inner liner sheet 14 attached to the opposite face 15 of the outer liner sheet 11, and an impingement sheet 16 which is supported in spaced relation to the inner liner sheet 14 by a spool 17 mounted on a fastener 18, such as a rivet. A bushing 19 and washer 20 are used to slidably secure the impingement sheet 16 so as to allow for thermal expansion of the liner 21 and impingement sheet 16. The bushing 19, which is secured to the outer liner sheet 11 by flaring both ends of the rivet 18, secures the liner 21 to the strap 22 which in turn attaches the liner to the structural component 23 or additional attachment structure.

Note in FIG. 1 that a liner cooling orifice 24 must be deleted at each rivet 18 location to provide space for the tooling necessary to flare the rivet 18. As the combustion gas 25 flows along the hot side 26 of the liner 21, the effect on the cooling film of deleting cooling orifices 24 in this manner is essentially the same as clogging some of the cooling orifices 24, that being non-uniform film replenishment at the rivet 18 locations resulting in hot streaks and the associated problems discussed above. To compensate for this condition, increased cooling air flow may be diverted to the liner assembly 10, thereby providing a thicker overall cooling film which, although thinnest at the fastener 18 locations, is still adequate to protect the liner 21. However, since the cooling air for the liner 21 must be bled from the compressor section of the gas turbine engine, increases in cooling air flow directly result in decreases in fuel efficiency and thrust performance.

What is needed is a liner that reduces the likelihood of hot streaks at the fastener locations without significantly increasing the amount of cooling air required by the liner.

SUMMARY OF THE INVENTION

It is therefore an object of the present invention to provide a liner assembly that reduces the likelihood of hot streaks at the fastener locations without significantly increasing the amount of cooling air required by the liner.

According to the present invention a thermal liner assembly is disclosed which includes uniformly spaced rows of cooling orifices oriented substantially perpendicular to the combustion gas flow. The orifices within each row are spaced equidistant from adjacent orifices within the same row, thereby providing a uniform, uninterrupted pattern of cooling orifices over the hot side of the liner. The liner is secured to a component of the gas turbine engine by a plurality of fasteners which are secured to the liner without affecting the uniform pattern of the cooling orifices. The resulting uniform pattern of cooling orifices uniformly replenishes the cooling film along the hot side of the liner, thereby reducing the likelihood that hot streaks will occur on the hot side surface of the liner.

Each of the fasteners disclosed incorporates a head which can be capacitor-discharge welded to the liner. Each fastener includes an integral flange which, in combination with a threaded portion and a nut, secures the fastener to the component to be protected and supports an impingement sheet in spaced relation to the liner. Use of the integrally flanged fastener reduces assembly time by eliminating the riveting procedure and reducing the number of individual parts required by fasteners of the prior art.

The foregoing and other features and advantages of the present invention will become more apparent from the following description and accompanying drawings.

BEST MODE FOR CARRYING OUT THE INVENTION

Figure 1:
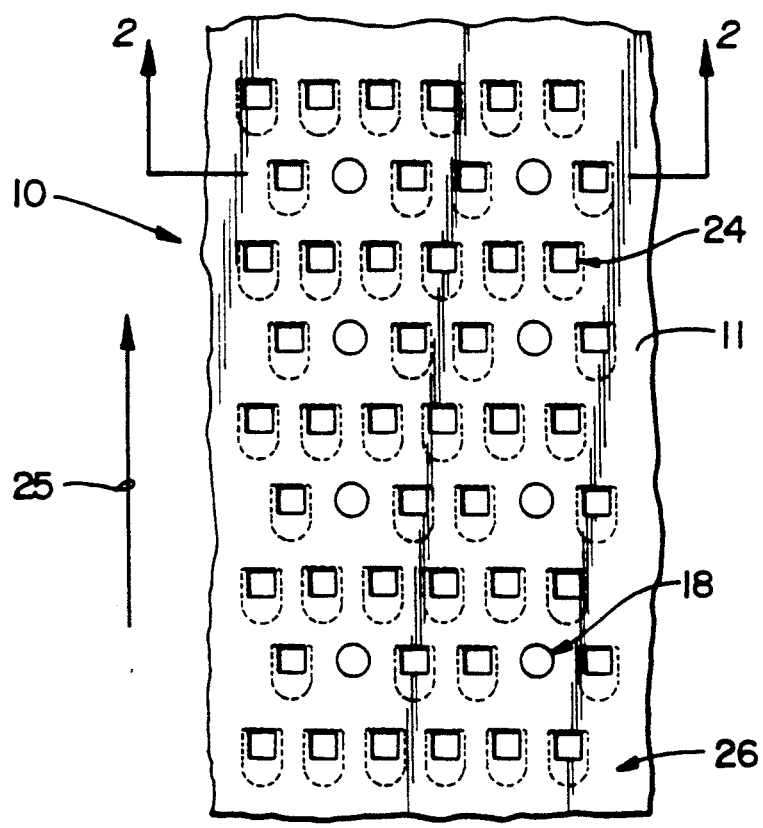
FIG. 1 is a plan view of a thermal liner assembly of the prior art.
Figure 2:
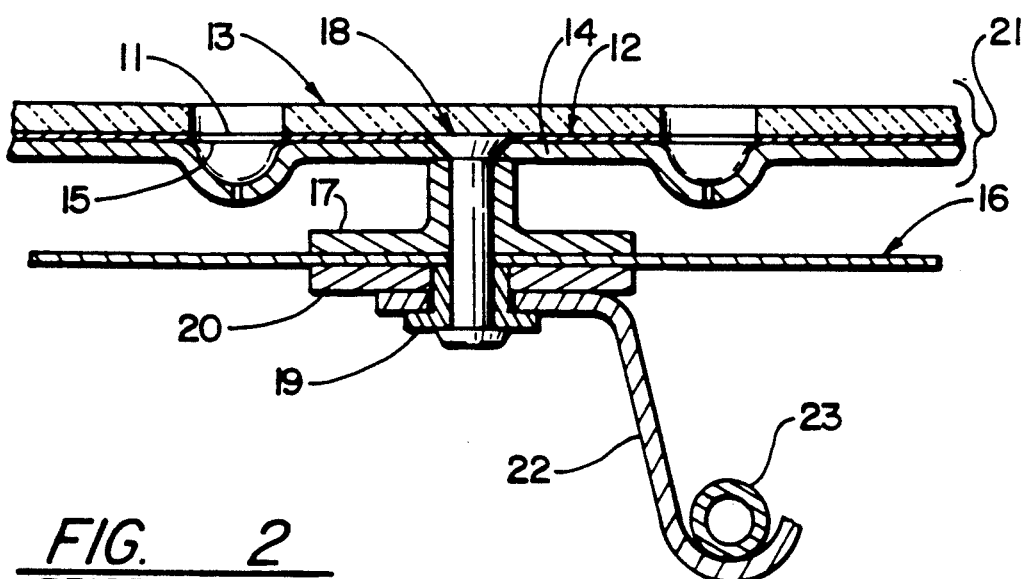
FIG. 2 is a cross-sectional view of the liner assembly of FIG. 1 taken along line 2—2.
Figure 3:
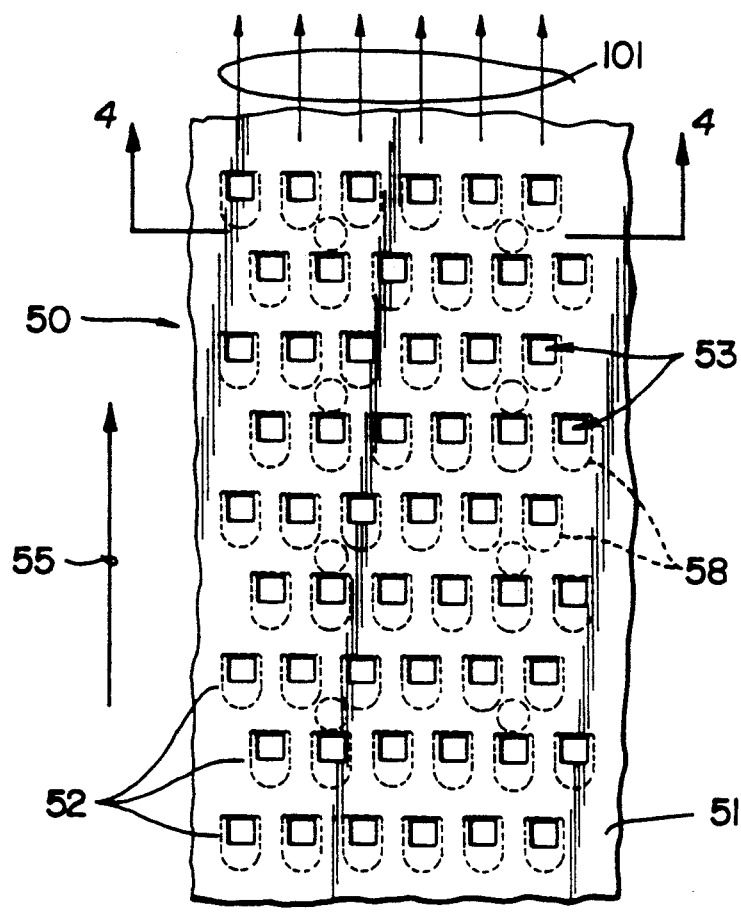
FIG. 3 is a plan view of a thermal liner assembly of the present invention.

Referring to FIG. 3, the fluid cooled liner assembly 50 of the present invention includes an outer sheet 51 having a plurality of rows 52 of cooling orifices 53 uniformly spaced across a first face 54 of the outer sheet 51. Each of the cooling rows 52 is oriented substantially perpendicular to the combustion gas flow 55, as shown in FIG. 3, to provide a uniform cooling film 101 across the combustion gas flowpath 55. All of the cooling orifices 53 have the same flow area, and the cooling orifices 53 within each row 52 are spaced equidistant from adjacent cooling orifices 53 in the same row 52. Those skilled in the art will readily appreciate from the foregoing discussion that the equidistant spacing is critical to producing the uniform cooling film replenishment necessary to prevent hot streaks.

Figure 4:
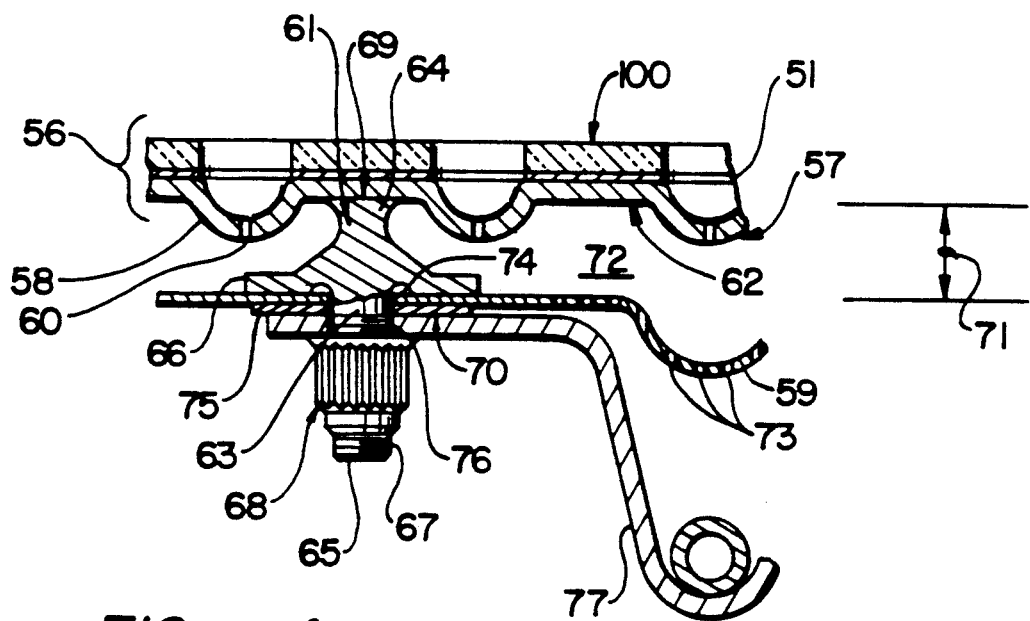
FIG. 4 is a cross-sectional view of the liner assembly of FIG. 3 taken along line 4—4.

The outer sheet 51 of the liner 56 is diffusion bonded to an inner sheet 57, as shown in FIG. 4, preferably by brazing. The inner sheet 57 includes a plurality of concave depressions 58, or "dimples". Each dimple 58 extends away from the outer sheet 51 toward an impingement sheet 59, and includes a supply hole 60 therein for introducing cooling fluid into the dimple 58. The flow area of each supply hole 60 is substantially less than the cooling orifice 53 in communication therewith for the reason discussed below. As shown in phantom lines in FIG. 3, each dimple 58 corresponds to one of the cooling orifices 53 and is aligned therewith. The outer 51 and inner 57 sheets may be made of one of the many materials which are known in the art to be useful for thermal liners. The outer sheet 51 preferably includes a thermal barrier coating 100 of the type known in the art to be useful for impeding the transfer of heat from the hot combustion gas of a gas turbine engine to a liner.

Referring back to FIG. 4, a plurality of liner fasteners 61 are fixedly secured to the inner sheet 57, preferably by capacitor-discharge welding. This welding produces a high strength joint without introducing the degree of thermal stress into the inner sheet 57 that other types of welding might introduce. Each fastener 61 is welded to the dimpled surface 62 of the inner sheet 57 in spaced relation to the adjacent dimples 58, thereby eliminating the need to delete a dimple 58 and cooling orifice 53 as was necessary in the prior art.

Each liner fastener 61 preferably includes a shaft 63 having a head 64 located at one end and a threaded end 65 opposite the head 64. An integral flange 66 is formed into the shaft 63 of each fastener 61 between the head 64 and the threads 67 of the threaded end 65. The head 64 of each fastener 61 is welded to the inner sheet 57, and a nut 68 is removably secured to the threads 67 of the threaded end 65.

Figure 5:
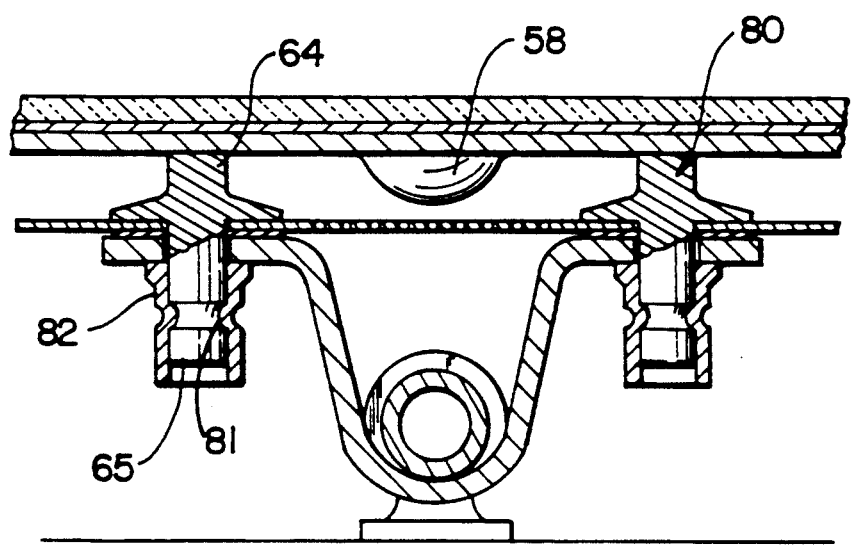
FIG. 5 is a cross-sectional view of the liner assembly of similar to FIG. 4 and incorporating a crimped collar fastener.

An alternative embodiment fastener 80 is shown in FIG. 5. This alternative embodiment 80 is essentially the same as the fastener 61, except that the end 65 opposite the head 64 includes an annular recess 81 instead of threads 67. A collar 82 slides onto the end 65 of the shaft 63 of each fastener 80. The collar 82 is crimped so as to extend into the recess 81, thereby securing the collar 82 to the shaft 63.

As those skilled in the art will readily appreciate, the fasteners 61, 80 of the present invention can be mass produced, and eliminate the need for the spools 17, washers 20 and bushings 19 required by the prior art, each of which had to be manufactured to exacting tolerances to ensure that warping of the liner 21 or impingement sheet 16 does not occur during operation of the engine. By contrast, the critical tolerance for the fastener 61 of the present invention is the length 71 of the shaft 63 from the end 69 of the fastener 61 adjacent the head 64 to the impingment sheet bearing surface 70 of the flange 66. As long as this dimension 71 is maintained within allowable tolerances during manufacture of the fasteners 61, warping of the liner 56 or impingement sheet 59 due to uneven support of the impingement sheet 59 should not occur. Additionally, use of the integrally flanged fastener 61 reduces assembly time by eliminating the riveting procedure and reducing the number of individual parts required by fasteners of the prior art.

The impingement sheet 59 is mounted in spaced relation to the inner sheet 62 thereby defining a cooling fluid supply plenum 72 therebetween. The impingement sheet 59 has a plurality of impingement holes 73 therein for supplying cooling fluid to the plenum 72. Additionally, the impingement sheet 59 includes a plurality of fastener holes 74 through which the shafts 63 of the fasteners 61 extend for securing the impingement sheet 59 to the inner sheet 57. Each fastener hole 74 has a diameter larger than the shaft 63 of the fastener 61 received therein and smaller than the diameter of the flange 66 of that fastener 61 to slidably secure the impingement sheet 59 in spaced relation to the inner sheet 57 while providing for differences in thermal expansion between the impingement sheet 59 and the inner sheet 57. The impingement sheet 59 includes a doubler 75, or washer-like reinforcement surrounding each fastener hole 74 to prevent excessive stress concentrations in the impingement sheet 59 at the fastener holes 74. Each doubler 75 includes a bore 76 for receiving the shaft 63 of a fastener 61, the bore 76 being coaxial with the corresponding fastener hole 74 and slightly smaller in diameter to ensure that stress concentrations occur in the doubler 75 and not the impingement sheet 59. The doublers 75 are preferably brazed to the impingement sheet 59.

Attachments such as attachment straps 77 are secured to the liner fasteners 61 by one of the nuts 68. Each strap 77 is sandwiched between the impingement sheet 59 and one of the nuts 68, while the impingement sheet 59 is sandwiched between the strap 77 and the flange 66. The straps 77 attach the liner assembly 50 to the component of the gas turbine engine which is to be protected from the combustion gas.

In operation, cooling fluid such as air is supplied to the side of the impingement sheet 59 on which the straps 77 are disposed. The cooling fluid passes through the impingement holes 73 into the plenum 72 where the fluid impinges the inner sheet 57, producing turbulent heat transfer from the inner sheet 57 to the fluid. The fluid then flows through the dimple supply holes 60 into the dimples 58, and from the dimples 58 through the cooling orifices 53. As those skilled in the art will readily appreciate, the substantially larger cooling orifices 53 are necessary to reduce the velocity of the fluid in order to provide a film 101 which "spills" into the combustion gas path instead of being injected into the gas path at the same velocity at which the fluid passed through the supply holes 60. The result is a film 101 of cooling air which flows over the thermal barrier coating 100 and provides the first layer of thermal protection. Because of the uniformity of the spacing of the cooling orifices 53 resulting from the absence of the deleted cooling orifices of the prior art, the cooling fluid film 101 is replenished uniformly thereby reducing the likelihood of hot streaks. Further, the uniform replenishment is achieved without significantly increasing cooling fluid flow to the liner assembly.

Although this invention has been shown and described with respect to detailed embodiments thereof, it will be understood by those skilled in the art that various changes in form and detail thereof may be made without departing from the spirit and scope of the claimed invention.

We claim:

1. A method of making a fluid cooled liner assembly for a gas turbine engine comprising:
   providing a linear including an outer sheet bonded to an inner sheet, the outer sheet having a plurality of rows of cooling orifices uniformly spaced across a first face of the outer sheet, the cooling orifices within each row uniformly spaced from adjacent cooling orifices in the same row, a plurality of dimples in the inner sheet, each dimple having a supply hole therein for introducing cooling fluid into the dimple, each dimple corresponding to one of the cooling orifices and aligned therewith;
   welding a plurality of liner fasteners to the inner sheet, each fastener including a shaft having a head located at one end and a threaded end opposite the head, each head welded to the inner sheet in spaced relation to the adjacent dimples;
   mounting an impingement sheet on the fasteners in spaced relation to the inner sheet; and
   securing an attachment strap to each of the fasteners for attaching the liner to a component of the gas turbine engine.

2. The method of claim 1 wherein each fastener is welded to the inner sheet by capacitor-discharge welding.

3. The method of claim 2 wherein each of said rows is oriented perpendicular to combustion gas flowing through said engine.

4. The method of claim 3 wherein each fastener includes
   an end opposite the head,
   a flange located between the head and the end opposite the head,
   securing means secured to the end opposite the head, and
   a doubler located between the flange and the end opposite the head.

5. The method of claim 4 wherein the end of each fastener opposite the head is threaded and the securing means of each fastener comprises a nut that is removably secured to the threaded end, and the impingement sheet is sandwiched between the doubler and the flange of each fastener, and the strap is sandwiched between the doubler and the nut of each fastener.

6. The method of claim 4 wherein each fastener includes an annular recess adjacent the end opposite the head, and the securing means of each fastener comprises a crimped collar that extends into the recess, and the impingement sheet is sandwiched between the doubler and the flange of each fastener, and the strap is sandwiched between the doubler and the collar of each fastener.

7. A fluid cooled liner assembly for a gas turbine engine for protecting a component of said engine from combustion gas of said engine, said liner assembly comprising:
   a liner including an outer sheet bonded to an inner sheet, the outer sheet having a plurality of rows of cooling orifices uniformly spaced across a first face of the outer sheet, the cooling orifices within each row spaced equidistant from adjacent cooling orifices in the same row,
   a plurality of dimples in the inner sheet, each dimple extending away from the outer sheet and having a supply hole therein for introducing cooling fluid into the dimple, each dimple corresponding to one of the cooling orifices and aligned therewith;
   a plurality of liner fasteners fixedly secured to the inner sheet in spaced relation to the adjacent dimples, each fastener including a shaft having a head located at one end and an end opposite the head, a integral flange formed into the shaft, said flange located between the head and the end opposite the head, and securing means secured to the end opposite the head;
   an impingement sheet secured to each of said fasteners by one of said nuts, said impingement sheet in spaced relation to the inner sheet defining a plenum therebetween, said impingement sheet having a plurality of impingement holes therein for supplying cooling fluid to said plenum; and
   attachment means for attaching the liner to a component of the gas turbine engine, said attachment means secured to said fasteners by said nuts.

8. The liner assembly of claim 7 wherein each of said rows is oriented substantially perpendicular to the combustion gas flowing through said engine adjacent said component.

9. The liner assembly of claim 8 wherein the impingement sheet comprises a plurality of fastener holes, each fastener hole having a diameter larger than the shaft of the fastener received therein and smaller than the diameter of the flange of the fastener received therein.

10. The liner assembly of claim 9 wherein said attachment means comprise a plurality of attachment straps, the end of each fastener opposite the head is threaded and each fastener further comprises a doubler and a nut removably secured to the threaded end, and the impingement sheet is sandwiched between the doubler and the flange of each fastener, and each strap is sandwiched between the doubler and the nut of each fastener.

11. The liner assembly of claim 10 wherein said attachment means comprise a plurality of attachment straps, each fastener includes an annular recess adjacent the end opposite the head, and each fastener further comprises a doubler and a crimped collar that extends into the recess, and the impingement sheet is sandwiched between the doubler and the flange of each fastener, and the strap is sandwiched between the doubler and the collar of each fastener.

* * * * *